United States Patent [19]
Whittingham

[11] 3,954,193
[45] May 4, 1976

[54] APPARATUS AND METHOD FOR TRANSFERRING A CRANE BOOM ASSEMBLY FROM A CRANE CARRIER TO AN INDEPENDENT TRANSPORT VEHICLE

[75] Inventor: Reginald P. Whittingham, St. Thomas, Pa.

[73] Assignee: Walter Kidde & Company, Inc., Clifton, N.J.

[22] Filed: Feb. 7, 1975

[21] Appl. No.: 548,149

[52] U.S. Cl. ............................... 214/38 R; 214/152; 212/144; 212/55; 214/83.24
[51] Int. Cl.² ......................................... B65G 67/02
[58] Field of Search .............. 214/38 R, 38 D, 38 C, 214/38 CC, 515, 83.24, 41; 212/35 R, 49, 55, 144; 52/143

[56] References Cited
UNITED STATES PATENTS

| | | | |
|---|---|---|---|
| 2,690,268 | 9/1954 | Woolslayer et al. | 214/38 R X |
| 2,787,342 | 4/1957 | Jenkins et al. | 52/143 X |
| 3,091,312 | 5/1963 | Woody et al. | 52/143 X |
| 3,302,806 | 2/1967 | Brown et al. | 214/38 R |

*Primary Examiner*—Albert J. Makay
*Attorney, Agent, or Firm*—Brady, O'Boyle & Gates

[57] ABSTRACT

For the purpose of complying with highway vehicle weight limitations, the boom assembly of a mobile construction crane is transferred from the regular crane carrier vehicle to an independent transport vehicle having a carriage means to receive and support the massive boom assembly for transport thereof.

20 Claims, 14 Drawing Figures

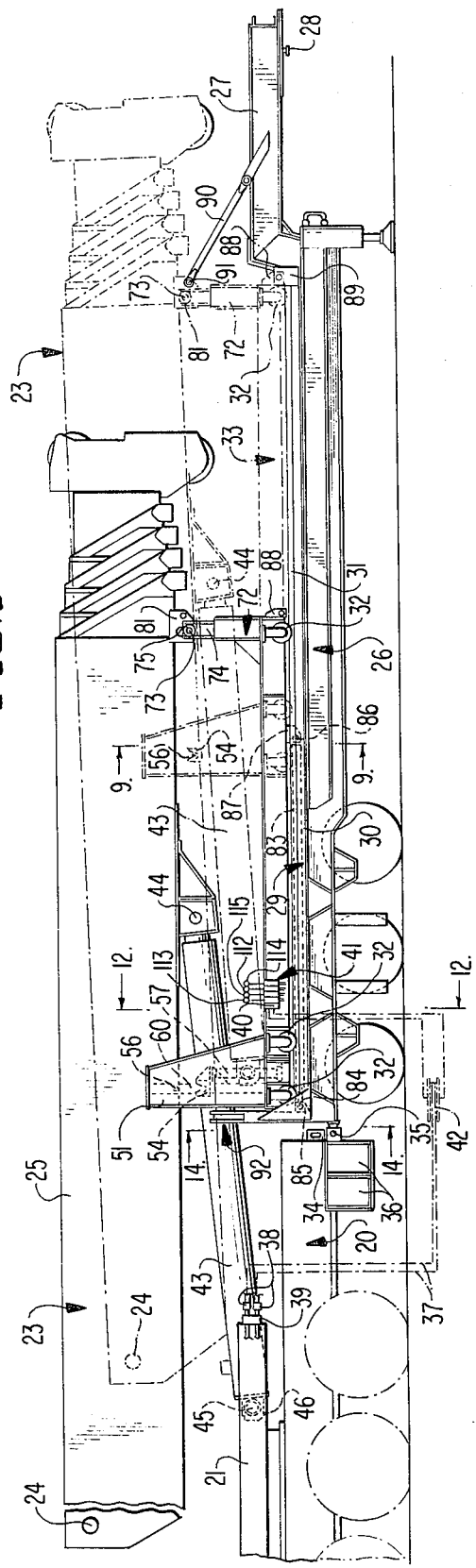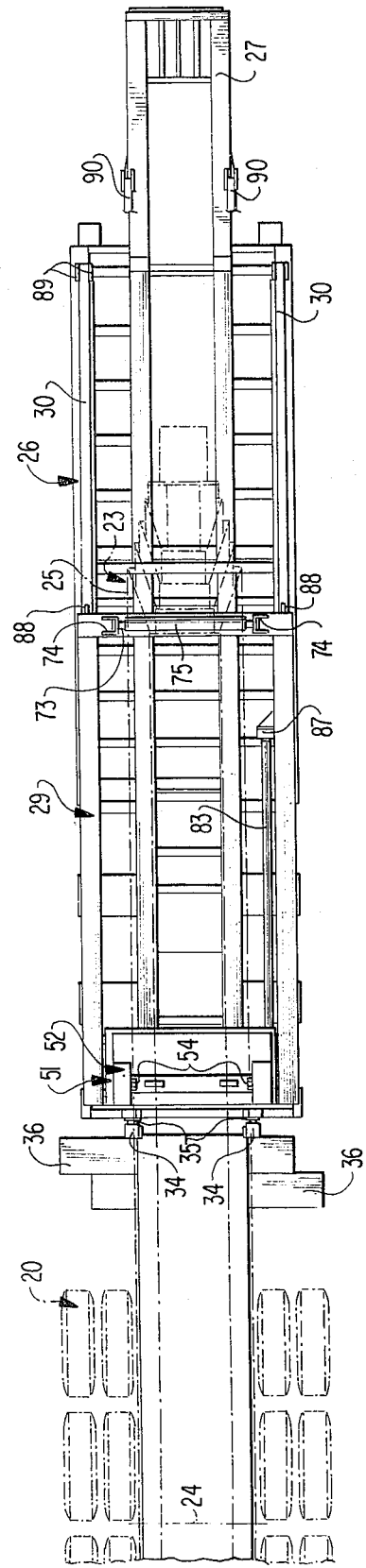

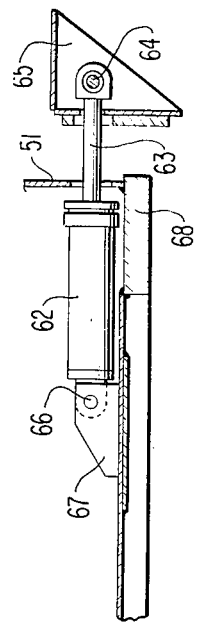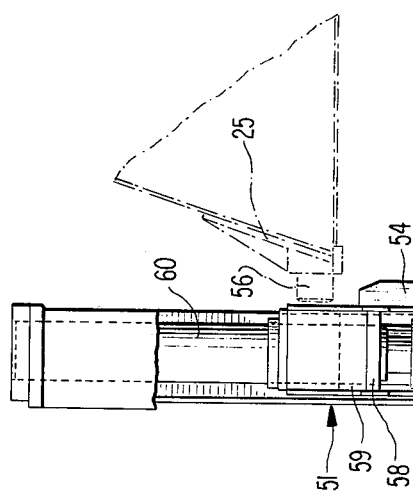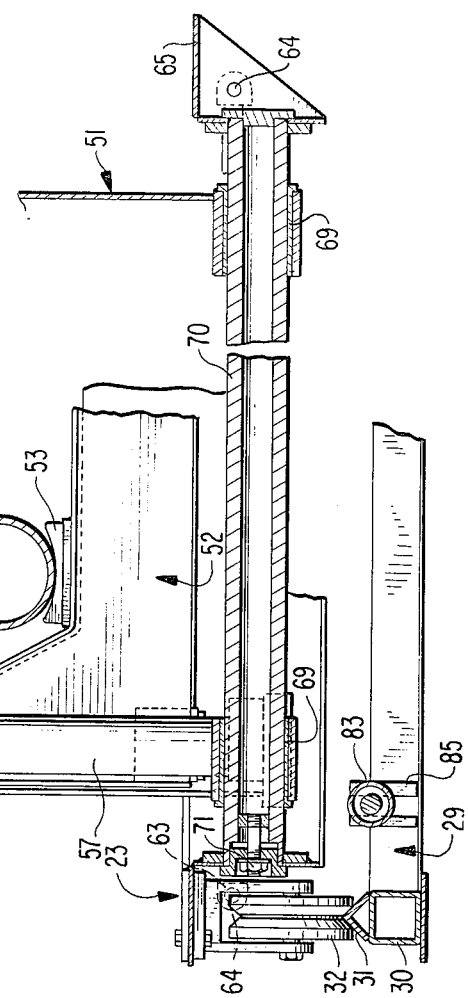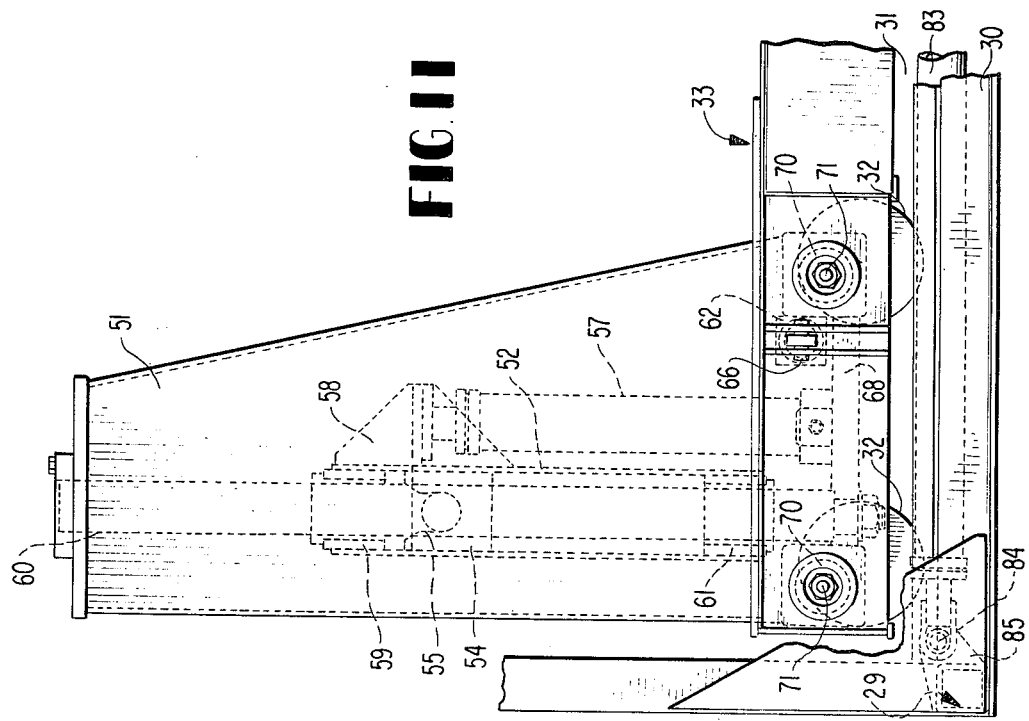

APPARATUS AND METHOD FOR TRANSFERRING A CRANE BOOM ASSEMBLY FROM A CRANE CARRIER TO AN INDEPENDENT TRANSPORT VEHICLE

BACKGROUND OF THE INVENTION

The rapid development of mobile construction cranes has resulted in the production of cranes having a lifting capacity of as much as 125 tons or more. Such cranes are necessarily quite massive and their total weight without loading exceeds the allowable vehicular weight on highways of certain jurisdictions. As a result of this, it has become desirable to distribute the total weight of the mobile crane on two separate vehicles for highway transport. The prior art has recognized the above problem in at least a broad sense, and one prior art teaching is contained in U.S. Pat. No. 3,302,806, issued to Brown et al. on Feb. 7, 1967.

The present invention is concerned primarily with an apparatus and a method for transferring the complete telescopically extensible boom assembly of a hydraulic construction crane from the customary motorized crane carrier vehicle to a separate and independent boom assembly transport vehicle having a suitable support carriage and anchoring means for the boom assembly during its subsequent travel on a highway. When the massive boom assembly is supported on the independent transport vehicle, such as a flat bed trailer, and the remainder of the crane structure is carried by the regular carrier vehicle, the weight of both vehicles will be well within prevailing highway regulations.

SUMMARY OF THE INVENTION

A flat bed transport trailer is coupled rear end to rear end with a crane carrier vehicle and the caravan is leveled by using the customary outrigger jacks of the crane carrier. The hydraulic systems of the two vehicles are interconnected. The retracted crane boom assembly is lowered over the rear of the crane carrier to extend horizontally over and lengthwise of the transport vehicle which includes a boom supporting carriage and means to move the carriage forwardly and rearwardly on the transport vehicle. The carriage initially is held in a rearward position. Locators on the forward end portion of the boom assembly are brought into engagement with a rest structure on the forward end of the carriage and are locked thereto. Journal boxes carrying the pivot elements for the lower ends of the boom lift cylinders are released by power means on the crane turntable and the hydraulic hoses of the lift cylinders are disconnected. A rearward cradle on the carriage is now elevated by power means into supporting lifting engagement with the boom lift cylinders to raise their journal boxes above the crane turntable and the elevating of the cradle is continued to a point short of an elevation where parts of the cradle will fully engage lift pins on opposite sides of the boom assembly. The main pivot elements for the base of the boom assembly are now extracted by power means connected with them and the weight of the boom is immediately transferred to blocks on the top of the turntable-mounted regular boom support structure. The hydraulic hoses for the telescoping boom cylinders are disconnected. The elevating of the rearward cradle is continued until lifting parts of the cradle complete their engagement with the boom lift pins and lift the boom sufficiently to free it from the crane superstructure. The cradle is now supporting the boom and the two boom lift cylinders. The carriage is advanced on the flat bed trailer with the boom assembly and coupled to securing means at the front of the trailer bed. The cradle at the rear of the carriage is lowered to transfer the weight of the boom to a fixed rear support on the bed of the trailer while the fully lowered cradle continues to support the boom lift cylinders. The boom is now clamped securely to the fixed rear support and the front of the boom assembly adjacent the rest structure at the forward end of the carriage is anchored to the trailer bed. The crane carrier and the boom assembly transport vehicle are uncoupled and the interconnecting hydraulic hoses are disconnected, and the boom assembly is ready for transport. When it is required to replace the boom assembly on the regular crane carrier, the above procedure is carried out in reverse sequence.

BRIEF DESCRIPTION OF DRAWING FIGURES

FIG. 1 is a side elevational view, partly broken away, of crane boom assembly transfer and supporting means embodying the invention and the crane carrier and independent transport vehicle with which the mechanism is used.

FIG. 2 is a plan view of the invention illustrated in FIG. 1.

FIG. 11 is an enlarged fragmentary side elevation of the rear end portion of the flat bed trailer mounted carriage and the rearward vertically shiftable cradle support thereof.

FIG. 12 is a fragmentary vertical cross section looking rearwardly toward the cradle support and taken substantially on line 12—12 of FIG. 1.

FIG. 13 is an enlarged fragmentary elevational view, partly in section, of a lateral adjustment power unit for the cradle support shown in FIG. 12.

DETAILED DESCRIPTION

Figure 3:
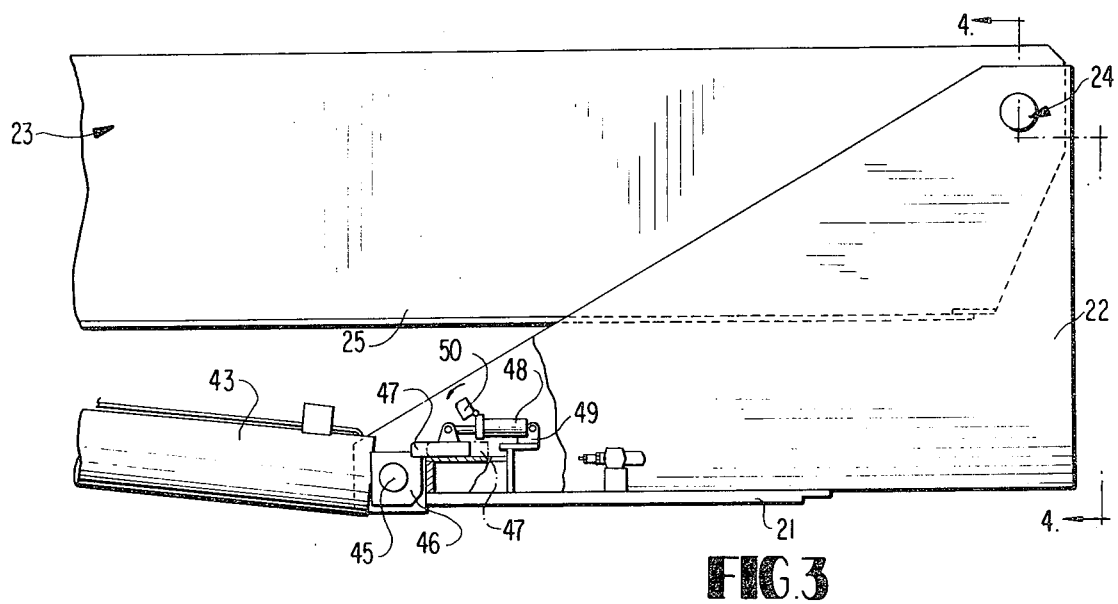
FIG. 3 is an enlarged fragmentary side elevation, partly in section, showing the boom pivot and its support structure and the crane turntable-mounted journal box means at the lower ends of the boom lift cylinders, together with safety locking means for the journal box means.
Figure 6:
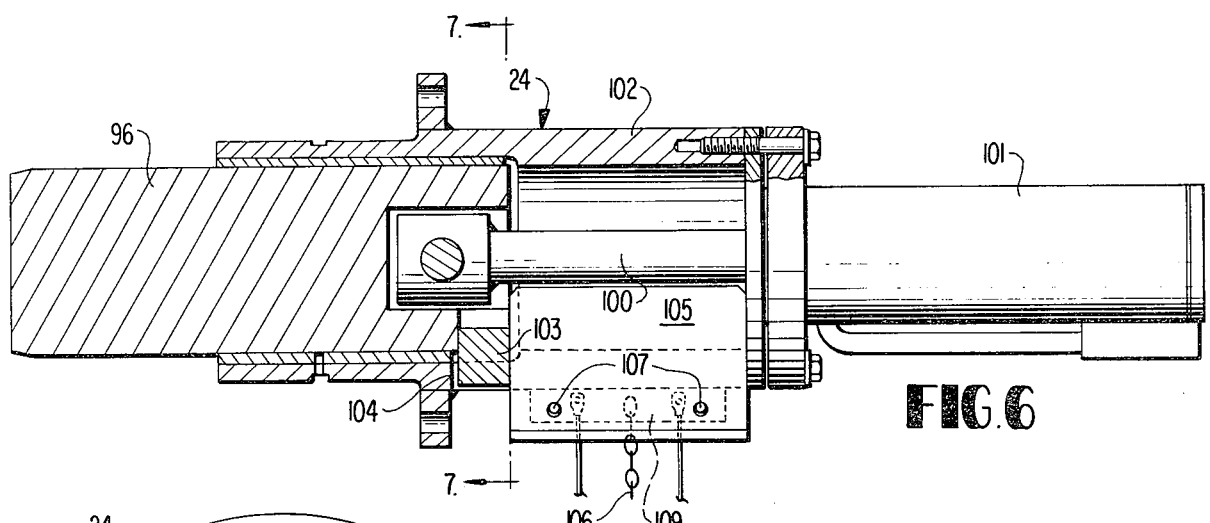
FIG. 6 is a cross sectional view taken through the pivot assembly on line 6—6 of FIG. 5.

Referring to the drawings in detail wherein like numerals designate like parts, it will be noted first that the invention will be described in connection with a mobile hydraulic construction crane having a telescopic extensible and retractable boom as disclosed in U.S. Pat. No. 3,386,594, issued to J. L. Grove on June 4, 1968. It should be understood that the invention is not restricted to this precise mobile crane, and the referenced patented crane is merely illustrative of a structure to which the invention is applicable. In a broader aspect, the method and apparatus constituting the invention is also applicable to different forms of cranes and crane booms including those having a fixed radius and certain booms which do not require lift cylinders.

Figure 4:
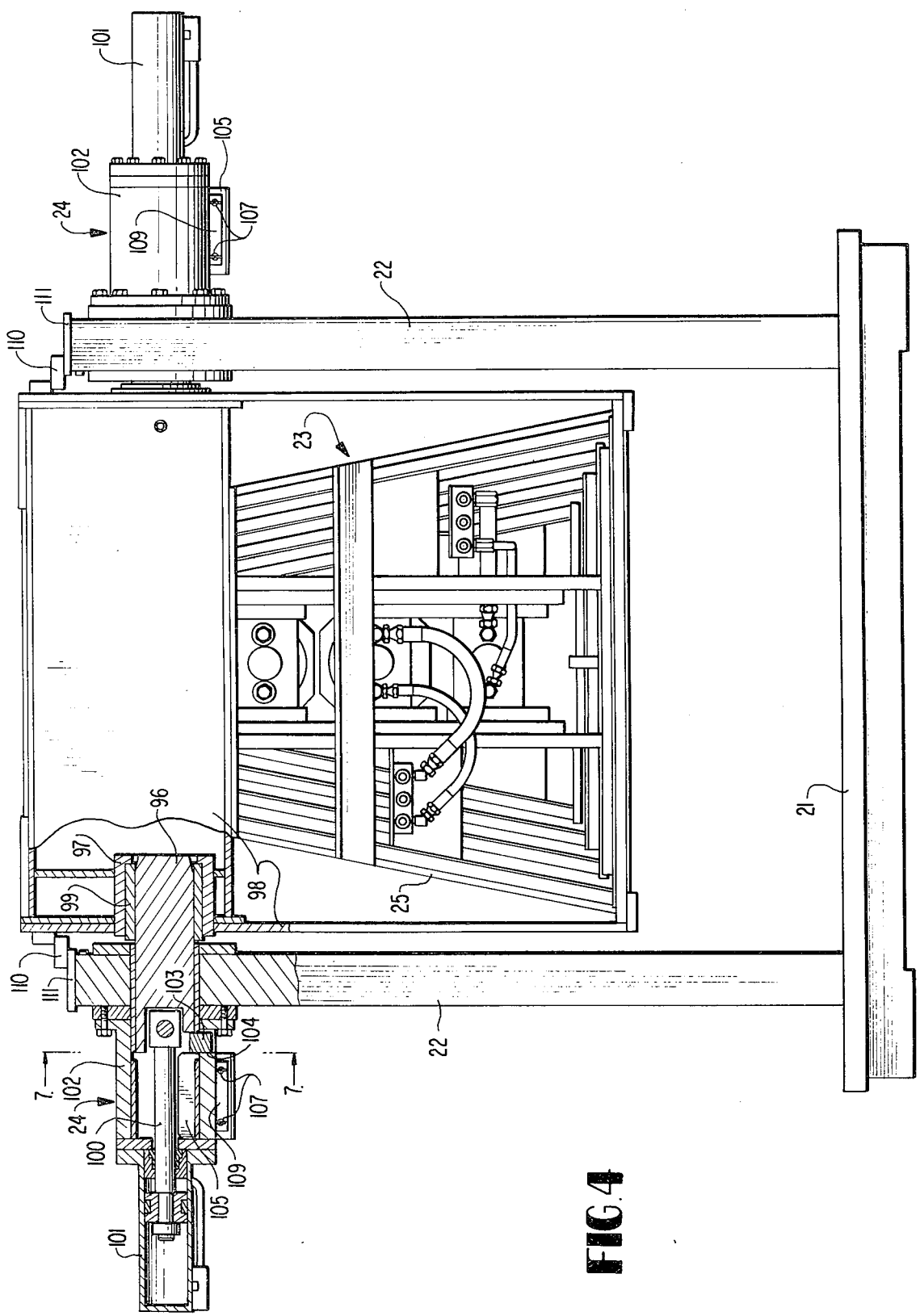
FIG. 4 is a rear end elevational view of the crane turntable and boom support structure including retractable boom assembly pivot elements taken substantially on line 4—4 of FIG. 3, one pivot element and associated parts being shown in cross section.

More particularly, referring to the drawings, the construction crane shown comprises a self-propelled carrier or base 20 having a vertical axis turntable 21 mounted thereon, including a rigid support frame 22 for a telescopic boom assembly 23, pivotally attached to the support frame 22 by pivot assemblies 24, such assemblies being shown in detail in FIGS. 4 through 7. The telescopic boom assembly 23 includes a plurality of extensible and retractable telescopic boom sections as illustrated in FIGS. 1, 2 and 4, and the outermost or base section 25 of this boom assembly is equipped to coact with the transfer and supporting means on the independent transport vehicle for the boom assembly designated by the numeral 26.

The independent boom assembly transport vehicle 26 is essentially a large flat bed trailer having a raised forward extension 27 and king pin 28 adapted for coupling with the fifth wheel of a suitable towing vehicle, not shown. The flat bed trailer has mounted thereon a low silhouette support base or frame 29 including parallel longitudinal sections 30 upon which are fixedly mounted parallel longitudinal tracks 31 for the wheels 32 of a fore and aft movable carriage 33, to be described in further detail.

The flat bed transport vehicle 26 and motorized crane carrier 20 are mechanically coupled during the boom assembly transfer operation by mating coupling elements 34 and 35 on the crane carrier and transport vehicle, respectively. The two vehicles are coupled in rear end to rear end closely spaced relation whereby the vehicle caravan may be properly leveled by the operation of the customary crane carrier outrigger jacks 36 shown in their retracted positions in FIGS. 1 and 2. Additionally, the hydraulic systems of the crane and the vehicle 26 are interconnected during the operation of the invention by suitable hydraulic hoses 37 having quick disconnect couplings 38 attachable to hydraulic fitting means 39 on the turntable 21. As shown schematically in FIG. 1, the interconnecting hoses 30 have their other ends coupled to the inlet 40 of a multiple control valve assembly 41 on the movable carriage 33, and whose use will be further described. To facilitate the fore and aft movement of the carriage 33 without hydraulic hose entanglement, a hose takeup reel 42 is also provided on the carriage 33 at a convenient point.

Figure 8:
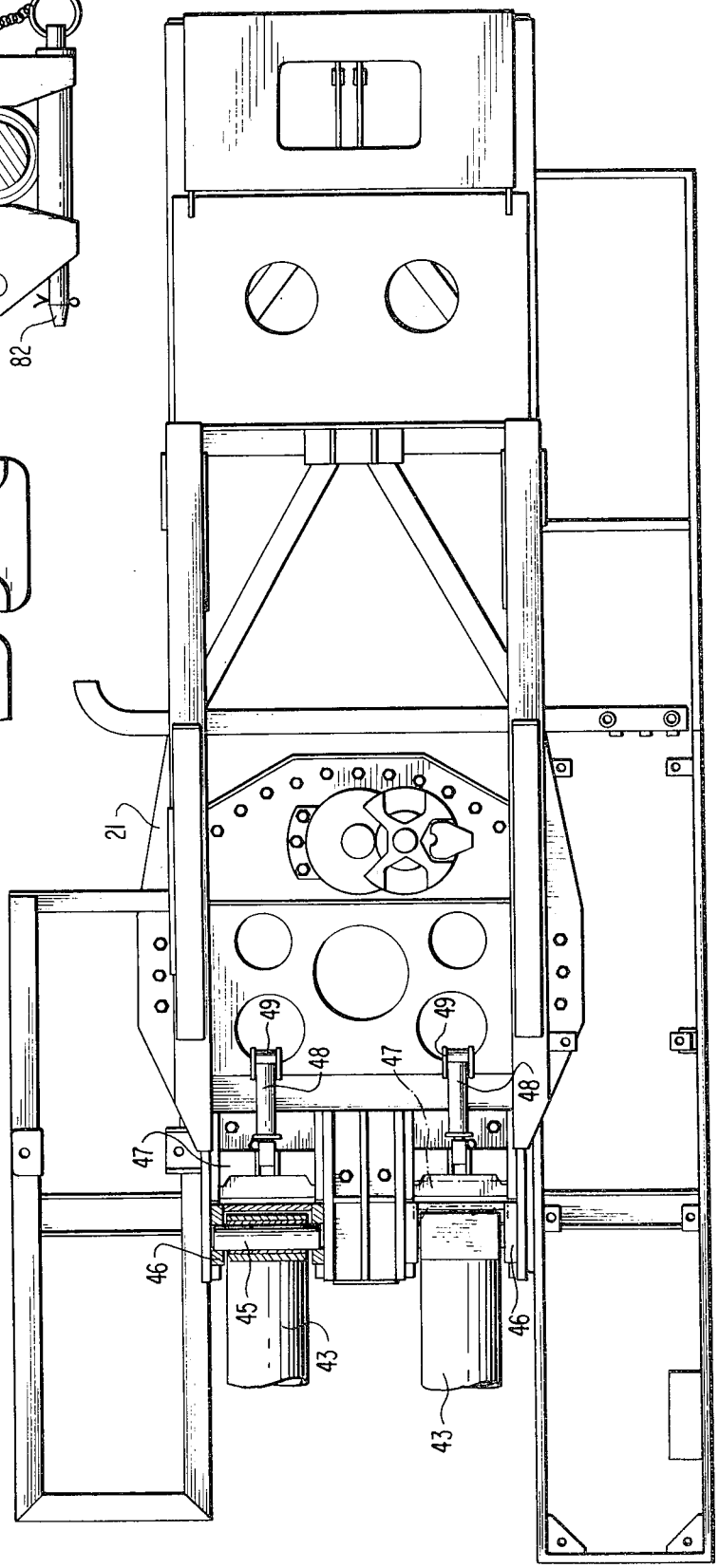
FIG. 8 is a plan view of the crane turntable assembly showing in particular the journal box means carrying the lower pivots of the boom lift cylinders and associated elements, partly in section.

As disclosed in the referenced U.S. Pat. No. 3,386,594, a pair of simultaneously-acting extensible and retractable boom lift cylinders 43 have their upper rod ends pivotally secured as at 44, FIG. 1, to the bottom of boom base section 25 near the longitudinal center of the latter. The rearward cylinder ends of the lift cylinders 43, FIGS. 3 and 8, carry transverse pivot pins 45 held within journal boxes 46 which are recessed into the turntable 21 and normally held captive on the turntable by horizontally shiftable locking dogs 47 adapted in their rearward positions to engage over the journal boxes 46 for locking them in place on the turntable immovably. The two locking dogs 47 are controlled by small hydraulic cylinders 48 suitably mounted on the turntable 21 as at 49 in FIGS. 3 and 8. In FIG. 3, the dogs 47 are shown in their retracted positions in broken lines, whereby the journal boxes 46 and pivot elements 45 are released for lifting along with the lower ends of the lift cylinders 43 for complete separation from the crane turntable during the boom assembly transfer operation. Pivoted safety plates 50 on the cylinders 48, FIG. 3, assure that the dogs 47 are normally held in their active positions during crane usage and cannot be accidentally retracted at those times.

Returning to the construction of the carriage 33 track mounted for fore and aft movement on the flat bed trailer 26, this carriage includes a rear end upstanding support frame 51 for a vertically shiftable cradle 52, FIGS. 11 and 12, adapted under certain conditions to lift and support the two boom lift cylinders 43 and the boom assembly 23. The elevatable cradle 52 has a pair of laterally spaced curved rests 53 for the engagement and support of the lift cylinders 43, only one of these rests and one lift cylinder being shown in FIG. 12. Above the rests 53 on the interior opposing vertical faces of the cradle 52 are upwardly open support or lift elements 54 whose entrance slots 55 are aligned with side projecting lift pins 56 on the base section 25 of the crane boom assembly substantially at the bottom of the base section 25.

The cradle including the elements 53 and 54 is raised and lowered by hydraulic cylinders 57 immediately in advance of the cradle 52 and within the interiors of the two side portions of the frame 51 which is of hollow construction. The upper rod ends of the cylinders 57 are attached to brackets 58 which in turn are carried by upper cradle guide bearings 59, movable along fixed vertical guide posts 60 within the two sides of frame 51 and rigid therewith. The vertically movable cradle 52 also has lower guide bearings 61 slidably mounted on the posts 60 for the further guidance and stabilizing of the cradle during its movement.

To insure a proper lateral alignment of the cradle 52 relative to the boom assembly 23 and the lift cylinders 43, a pair of lateral adjustment hydraulic cylinders 62, FIG. 13, have their rods 63 attached as at 64 to bracket elements 65 which are parts of the movable carriage 33 at the opposite sides thereof. The cylinder ends of the units 62 are attached at 66 to additional brackets 67 integral with the base member 68 of support frame 51 on which the cradle 52 is mounted. The support frame 51 through slide bearings 69 is supported bodily for lateral adjustment on a pair of transverse parallel guide bars 70 substantially adjacent to the wheels 32 at the rear of the carriage 33. Thus, by the operation of the cylinders 62 and slow-acting control valve means, yet to be described, the cradle 52 and its support is rendered laterally adjustable of the carriage 33 along the bars 70 to assure proper alignment of the elements 53 and 54 with the parts they are to engage and support. The two guide bars 70 are rigidly secured as by threaded means 71 to the opposite side members of the carriage 33 immediately inwardly of the wheels 32.

Figure 9:
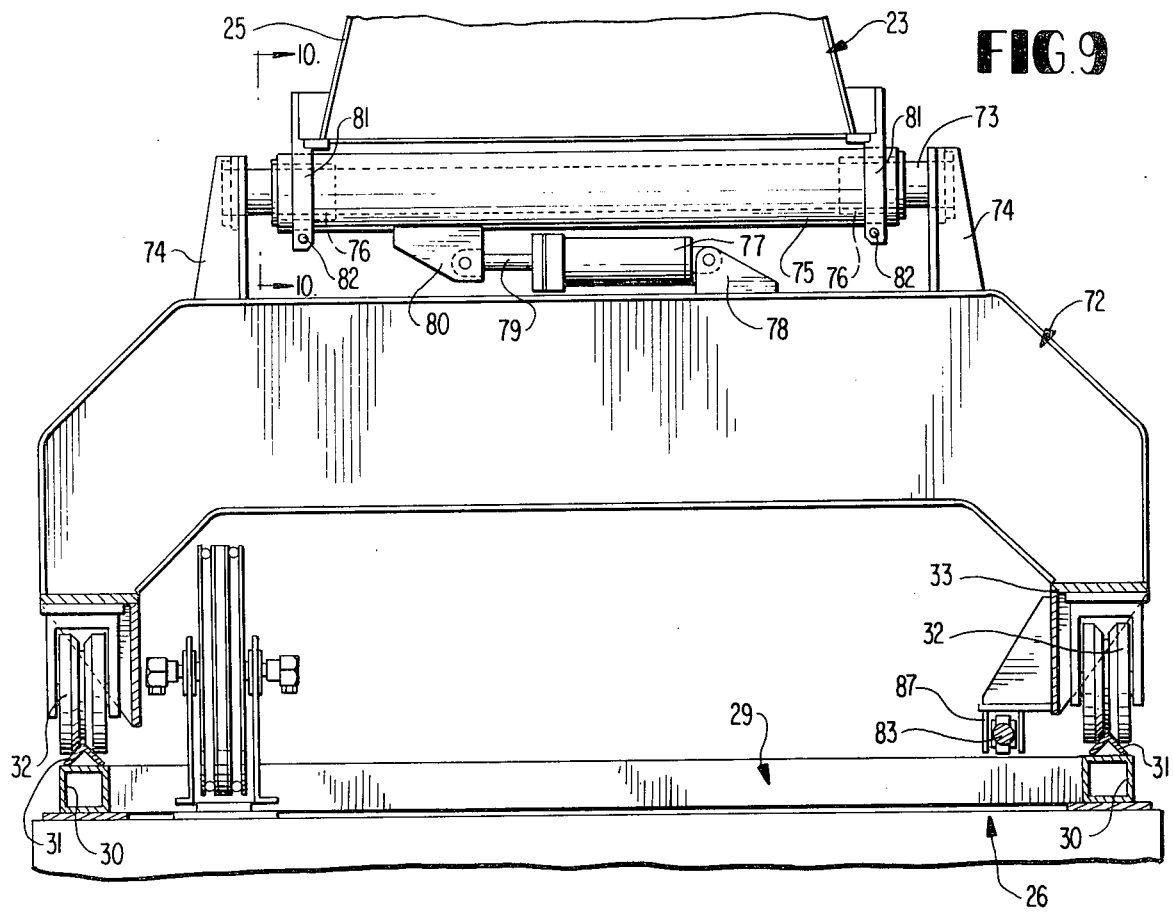
FIG. 9 is a fragmentary vertical section taken on line 9—9 of FIG. 1.

The carriage 33 at its forward end has rigidly mounted thereon a sturdy boom rest 72, FIG. 9, which spans the carriage transversely considerably above the carriage wheels 32 and their tracks 31. A transverse boom rest bar 73 is supported by a pair of spaced uprights 74 on the rest 72 and a sleeve member 75 is slidably mounted through its bearings 76 on the rest bar 73 for endwise movement thereon or movement transversely of the carriage 33. Such movement or adjustment of the sleeve 75 is under control of a hydraulic cylinder 77 secured to the rest 72 through a bracket 78 with its rod 79 attached to another bracket 80 depending from the sleeve 75. The sleeve 75 is shorter than the distance between the two uprights 74, thereby providing a considerable range of adjustment for the sleeve on the bar 73. This, in turn, assures proper lateral alignment of the sleeve 75 with a pair of side downwardly open locators 81 rigidly secured to opposite sides of the boom base section 25 near its forward end, FIGS. 1, 9 and 10. The two locators 81 project below the bottom of the boom assembly 23 to engage over the sleeve 75 of rest bar 73 when the boom assembly is initially lowered to a substantially level position beyond the rear end of the crane carrier 20 at the start of the transfer process. Such engagement of the locators 81 and transverse sleeve 75 will afford support for the front of the boom assembly on the carriage 33 while the latter is in its retracted position shown in full lines in FIG. 1.

Figure 10:
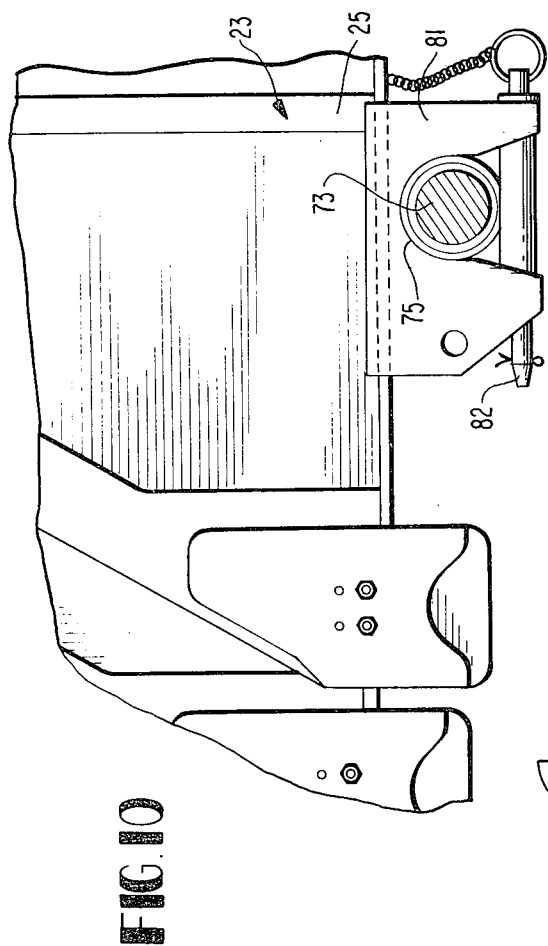
FIG. 10 is a fragmentary side elevation of a locking pin means for a boom assembly rest taken on line 10—10 of FIG. 9.

Manual locking pins 82 are placed through apertures in the two locators 81 at this time and pass beneath the sleeve 75, FIG. 10, to securely lock the front of the boom assembly 23 to the forward rest 72 of the carriage 33.

The carriage 33 is moved forwardly and rearwardly along the tracks 31 by a long horizontal hydraulic cylinder 83, FIGS. 1, 11 and 12, whose rearward rod end is coupled at 84 with bracket means 85 rigid with the stationary base or frame 29 carrying the tracks 31. The cylinder end of the unit 30 is coupled at 86 to a depending element 87 on the carriage 3, whereby extension and retraction of the cylinder 83 will advance and retract the carriage 33 along the tracks 31 of the flat bed trailer. When the carriage 33 is fully advanced on the trailer to the position shown in dotted lines in FIG. 1, forward coupling plates 88 provided on the carriage are pinned or coupled with aligned apertured plates 89 fixedly mounted on the front portion of the trailer vehicle, FIGS. 1 and 2. This securely locks the carriage 33 in the forwardmost boom assembly transport position on the trailer vehicle 26.

For additional security during the transport operation, adjustable anchors or hold-downs 90 on the forward extension 27 of the trailer vehicle are attached with pins 91 to the fronts of the two locators 81 of the boom assembly.

Figure 14:
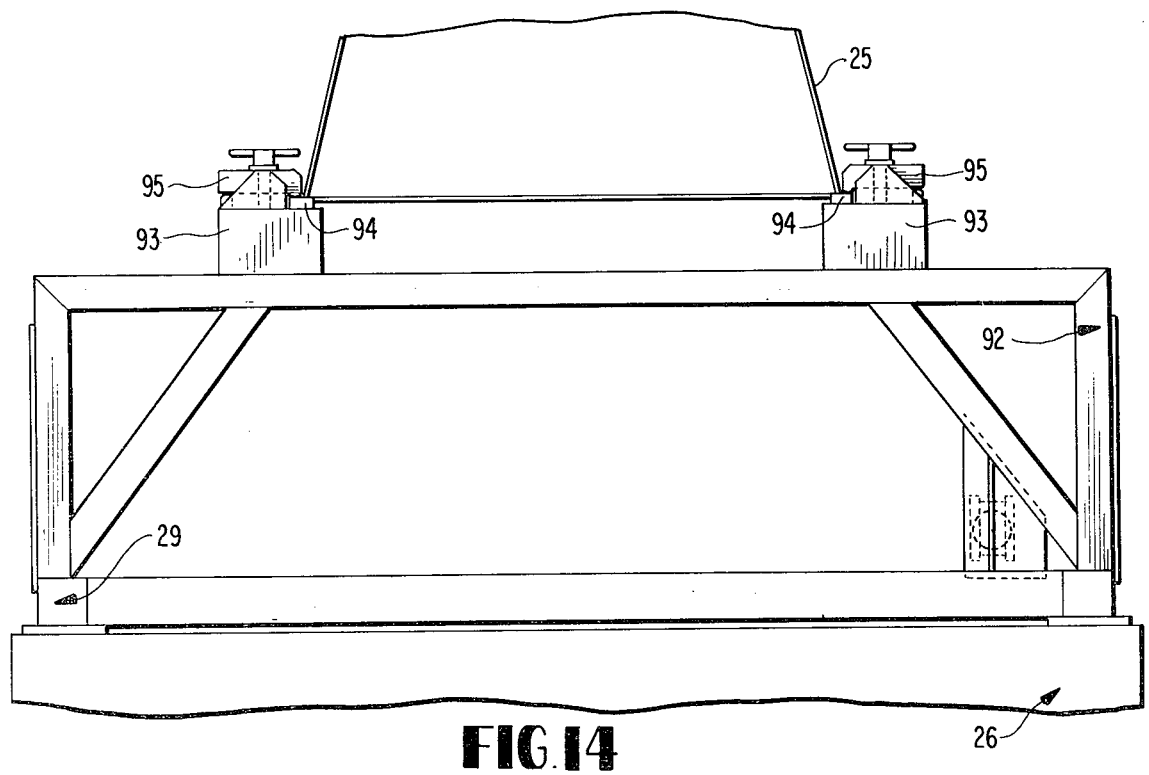
FIG. 14 is a fragmentary vertical section taken on line 14—14 of FIG. 1 and showing particularly the rear fixed support and clamping means for the boom assembly on the flat bed transport trailer.

Additionally, the trailer vehicle 26 at its rear end carries a stationary upright boom assembly support or rest structure 92, FIG. 14, rigidly mounted upon the base 29. Two laterally spaced blocks 93 are fixed to the top of the rest structure 92 to contact bottom side flanges 94 on the boom base section 25 so as to bear the weight of the transferred boom assembly at the proper time. A pair of strong releasable clamping devices 95, FIG. 14, are provided on the blocks 93 to engage the tops of flanges 94 and clamp them securely to the blocks of the rest structure 92 so as to assure safe and stable transport of the transferred boom assembly 23 on the independent transport trailer 26.

Referring now to FIGS. 4 through 7, in particular, which show the previously-mentioned boom pivot assemblies 24 on the boom support frame 22 of turntable 21, such assemblies comprise transversely aligned boom pivot pins 96 which project through journals 97 rigid with the customary suspension structure 98 of the boom assembly 23 which adapts the boom base section 25 for connection with its pivot assemblies 24. Suitable bushings 99 are intervened between the pivot pins 96 and journals 97, as shown in FIG. 4.

Figure 5:
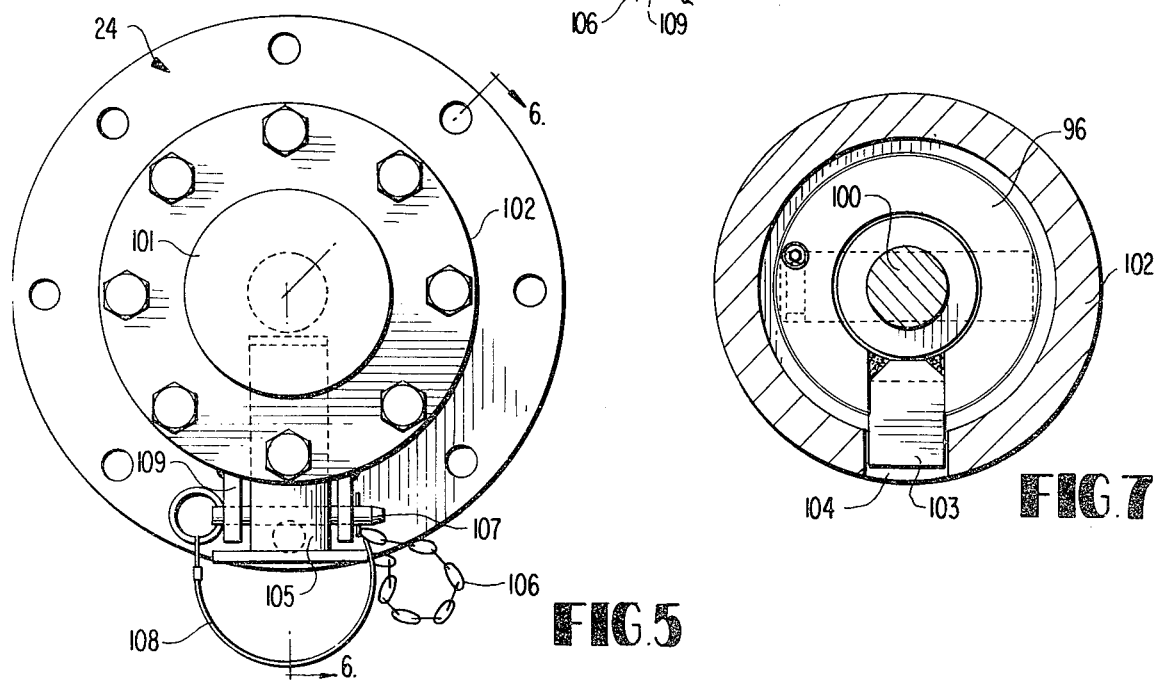
FIG. 5 is an end elevation of a boom pivot assembly.
Figure 7:
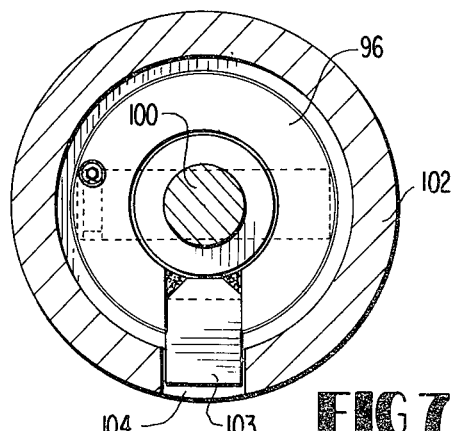
FIG. 7 is a transverse cross section taken through the boom pivot assembly on lines 7—7 of FIGS. 4 and 6.

To render the two boom pivot pins 96 retractable at proper times during the transfer procedure, these two pins are coupled with piston rods 100 of hydraulic cylinders 101, secured to housings or adapters 102, in turn suitably anchored to the two sides of the boom support 22. Key elements 103 on the pivot pins 96 engage slots 104 of the housings 102 to prevent rotation of the pivot pins on their longitudinal axes. Safety locking elements or blocks 105 are provided to be engaged rearwardly of the pins 96 in the fixed housings 102 so that the pivot pins cannot be accidentally retracted from the journals 97 of the boom assembly during normal usage of the boom on the crane carrier 20. The safety locking elements 105 are tethered to the assemblies 24 by chains 106. The locking elements 105 themselves are secured in place in the assemblies 24 by manual locking pins 107 tethered on cables 108. The pins 107 are passed through registering apertures in the elements 105 and in flanges 109 secured to the housings 102, as best shown in FIG. 5.

As shown in FIG. 4, blocks 110 rigidly secured to opposite sides of the boom suspension structure 98 are disposed above bearing pads or plates 111 on the tops of the sides of boom support 22, the pads 111 preferably having crowned top faces to provide lines of contact between them and the blocks 110. In normal assembled relationship on the crane, the elements 110 and 111 are substantially in contact or spaced a very slight amount only. These elements serve temporarily to support the rear of the boom assembly 23 when the boom pivot pins 96 are retracted, and prior to the transfer of the boom assembly to other supporting means on the carriage 33.

Operation

The operation of the described mechanism in the practice of the method of transferring the boom assembly 23 from the regular crane carrier 20 to the independent transport vehicle 26 will now be summarized. After coupling the two vehicles 20 and 26 rear end to rear end by the means 34–35 and leveling the caravan by use of the outrigger jacks 36 and interconnecting the vehicle hydraulic systems by means of the hoses 37, the actual boom transfer method is ready to commence.

With the carriage 33 in its rearmost position on the trailer 26, the fully retracted boom asssembly 23 is lowered over the rear end of the crane carrier to extend horizontally above the carriage 33 and flat bed trailer 26. As described, the forward locators 81 on the boom base section 25 are engaged over the sleeve 75 of rest bar 73 and locked in such engagement by the manual pins 82. Any necessary lateral adjustments of the sleeve 75 by its adjustment cylinder 77 to facilitate the proper engagement with the locators 81 are now made by using the forward lateral control valve handle 112 of the control valve assembly 41, FIG. 1. This particular valve component of the assembly 41 controls the operation of the adjustment cylinder 77 through conventional connections, not shown.

Following the engaging and locking of the locators 81 on the forward rest 72 of the carriage 33, the journal boxes 46 with the pivot elements 45 for the lower ends of the two boom lift cylinders 43 are released from their seats in the turntable 21 by operation of the two cylinders 48 to retract the journal box locking dogs 47. The controls for the cylinders 48 on the crane carrier are conventional and need not be shown. The lift cylinders 43 remain coupled with the boom base section 25 through their forward pivots 44. The hydraulic hoses leading to the lift cylinders 43 are disconnected.

The cradle 52 on the rear support 51 of carriage 33 is now elevated by means of the lift cylinders 57 sufficiently to cause the rests or seats 53 to engage and pick up the lift cylinders 43 with their journal boxes 46 and pivot elements 45 attached and raise the lift cylinders clear of the turntable 21. The elevating of the cradle 52 continues to a point short of full engagement of the lift elements 54 with the lift pins 56 on the opposite sides of the boom assembly, FIGS. 11 and 12. The vertical movement of the cradle 52 is under control of another control valve handle 113 on the assembly 41. The several valve components of the assembly 41 are special slow-acting valves to allow the necessary fine adjustment of the carriage parts which they control.

At this time, the two boom pivot pins 96 are withdrawn from the journals 97 of the boom suspension structure by simultaneous operation of the two cylinders 101 responsive to conventional controls of the crane. When the pins 96 are fully withdrawn, the weight of the boom assembly 23 is transmitted to the support structure 22 through engagement of the contacting elements 110 and 111, so that there is no danger of the rear end of the boom assembly dropping. The hydraulic hoses for the boom telescoping cylinders in the assembly 23 are now disconnected.

Following this, the elevation of the cradle 52 is again commenced by manipulating the valve handle 113 until the lift elements 54 and 56 are fully engaged and the rear of the boom assembly 23 is lifted clear of the crane superstructure. At this time, the cradle 52 is fully supporting the rear of the boom assembly and the two boom lift cylinders 43.

It should also be mentioned that prior to the initial elevation of the cradle 52 any necessary fine lateral adjustment of the cradle and the support structure 51 relative to the carriage 33 is carried out by operation of the cylinders 62 under control of another slow-acting control valve 114 in the assembly 41, FIG. 1.

With the boom assembly clear of the crane superstructure and supported by the cradle means 52 and forward carriage rest 72, carriage 33 is advanced to its forward position on the trailer 26 by the hydraulic cylinder 83 which is under control of another control valve 115, the final valve component of the assembly 41. The carriage 33 is pinned or locked in its forward position on the trailer bed through the coupling means 88 and 89.

Following this, the cradle 52 is lowered to transfer the weight of the boom assembly to the fixed rear rest or support structure 92 of the trailer and the boom asembly is clamped to this support in the manner previously described in connection with FIG. 14. The cradle 52 is completely lowered on the support 51 and continues to support the lift cylinders 43 which ordinarily need not be lashed to the cradle due to their great weights but could be lashed, if desired. The boom assembly 23 is now fully and safely supported on the carriage 33 through its forward rest structure 72 and by the rearward support structure 92 of the trailer vehicle. It may be noted that with the carriage 33 in its advanced position on the trailer 26 and with the completely transferred boom assembly 23 arranged in the dotted line position in FIG. 1, the weight of the heavy assembly is rather evenly distributed on the transport trailer. The anchoring means 90 may now be secured as described and after separating the couplings 34-35 and disconnecting the hoses 37, the boom assembly is ready for transport.

When it is desired to transfer the boom assembly back to the crane carrier 20, the described procedure is carried out in a reverse sequence and it is thought that no detailed description of the reverse sequence is necessary to a full understanding of the invention.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A method of transferring a crane boom from a carrier vehicle to an independent transport vehicle comprising the steps of lowering the crane boom while attached to said carrier vehicle to a substantially horizontal position above said transport vehicle and engaging the lowered boom with a first support on the transport vehicle, disconnecting the boom from the carrier vehicle and thereafter engaging and lifting the boom free of the carrier vehicle by means of a second support on the transport vehicle, moving the first and second supports on the transport vehicle with the supported boom to a forward transport position on said vehicle and then lowering the boom in relation to the second support into supportive engagement with a third support on the transport vehicle near the rear thereof.

2. The method as defined in claim 1, and the additional steps of locking the transferred boom on the transport vehicle immovably relative to the first and third supports of the transport vehicle, and additionally locking the first and second supports at said forward transport position on said transport vehicle.

3. The method as defined in claim 1, and the additional step of disconnecting boom lift cylinders from said carrier vehicle and engaging and lifting the boom lift cylinders free of the carrier vehicle and supporting them with said second support on the transport vehicle prior to disconnecting the boom from the carrier vehicle.

4. The method as defined in claim 1, and the preliminary steps of mechanically coupling said carrier and independent transport vehicles rear end to rear end and leveling them prior to said lowering of the crane boom to said substantially horizontal position.

5. A method of transferring a crane boom from a carrier vehicle to an independent boom transport vehicle comprising the steps of lowering the boom while on the carrier vehicle to a down position over the transport vehicle and thereby engaging a forward end portion of the boom with a forward carriage rest on the transport vehicle and while the carriage rest is in a rearward position on the transport vehicle, separating said boom from its connections with the carrier vehicle and thereafter supportively engaging the boom and lifting it free of the carrier vehicle by operation of a second carriage rest on said transport vehicle and while the second carriage rest is in a rearward position on the transport vehicle, advancing the first and second carriage rests with said boom in unison to a forward transport position on said transport vehicle and locking the advanced first and second carriage rests at said forward transport position on the transport vehicle and then lowering the rearward end of the boom into supportive engagement with a third and stationary rest on the rear of said transport vehicle and rearward of said second carriage rest and thereby relieving the second carriage rest of its supportive engagement with said boom.

6. Apparatus in combination with a crane boom for transferring the crane boom from a crane carrier vehicle to an independent boom transport vehicle comprising a transport trailer having a tracked bed, a boom support and transfer carriage guidingly mounted on the tracked bed for fore and aft movement thereon, power means connected with the tracked bed and said carriage to advance and retract the carriage on said bed, a forward boom rest on said carriage adapted to supportively engage locator means near the forward end of the boom after the boom is lowered to a substantially horizontal position above said carriage and tracked bed, a rearward boom rest on said carriage including an elevatable cradle means adapted to engage and lift the rear portion of the boom after separation from the carrier vehicle and after said supportive engagement with said forward boom rest, and means to lock said carriage in an advanced position on said transport vehicle.

7. The apparatus as defined by claim 6, and independently operable power means coupled with said forward boom rest and said rearward boom rest to adjust the same laterally of said carriage and tracked bed to achieve proper alignment with a crane boom being transferred by the apparatus.

8. The apparatus as defined by claim 6, and said rearward boom rest further comprising power lift and vertical guideway means for said cradle means above said carriage, said cradle means having spaced supporting elements for a pair of boom lift cylinders and a pair of spaced boom lift elements above said supporting elements and laterally outwardly thereof, whereby said cradle means may first be raised into supportive engagement with boom lift cylinders and upon continued elevation may afterwards by supportively engaged with side lifting parts of a boom.

9. The apparatus as defined by claim 8, and support and lateral guidance means for said rearward boom rest on said carriage and power means connected with said boom rest to shift it laterally in opposite directions on said support and guidance means.

10. The apparatus as defined in claim 7, and said independently operable power means comprising a single power cylinder coupled to said carriage and forward boom rest, and a pair of opposing power cylinders coupled to said carriage and to said rearward boom rest.

11. The apparatus as defined by claim 7, and said forward boom rest comprising a transverse rest bar on said carriage, and a rest sleeve slidably mounted on said bar and connected with said power means coupled with said forward boom rest.

12. The apparatus as defined by claim 11, and laterally spaced boom carried locator elements adapted to engage said rest sleeve supportively.

13. The apparatus as defined by claim 12, and means to releasably lock said locator elements in engagement with said rest sleeve.

14. The apparatus as defined by claim 6, and a relatively stationary boom support on the rear of said transport vehicle and rearwardly of said carriage and adapted to bear the weight of a boom conjointly with said forward boom rest on said carriage after said carriage is advanced by said power means and the boom is lowered into supportive engagement with said stationary boom support by said cradle means of the rearward boom rest on said carriage.

15. The apparatus as defined by claim 14, and means on said relatively stationary boom support to clampingly lock the boom in engagement with the stationary boom support.

16. The apparatus as defined by claim 15, and said last-named means comprising a pair of laterally spaced clamping devices at the top of said stationary boom support engageable with projecting side flanges of a boom resting on said stationary support.

17. The apparatus as defined by claim 6, a rear stationary boom rest on said transport vehicle rearwardly of said carriage and of a height to receive and support the rear portion of the boom after the boom is advanced with said carriage and lowered by said cradle means, and means on the rear of said transport vehicle for mechanically coupling it to the rear of a crane carrier vehicle.

18. The apparatus as defined by claim 6, and power means on a crane carrier vehicle having a boom and boom lift cylinders to disconnect the boom and said lift cylinders from their supports on the crane carrier vehicle.

19. In apparatus for transferring a telescopic crane boom from a crane carrier vehicle to an independent boom transport vehicle, means to couple a crane carrier vehicle and said transport vehicle in back to back relation, means to level said coupled vehicles, power means on said crane carrier vehicle to disconnect the crane boom and crane boom lift cylinders therefrom, a carriage on said transport vehicle, power means connected with said carriage to advance and retract the same on the transport vehicle, forward and rear boom rests on said carriage, the rear boom rest including a vertically movable cradle and power means to raise and lower the cradle, said cradle having boom and boom lift cylinder engaging parts, and a rear stationary boom support on the transport vehicle.

20. Apparatus as defined by claim 19, means to couple said carriage in an advanced position on said transport vehicle, and means to releasably lock a transferred crane boom to said forward boom rest and rear stationary boom support for safe transport on said vehicle.

* * * * *